United States Patent Office 3,515,992
Patented June 2, 1970

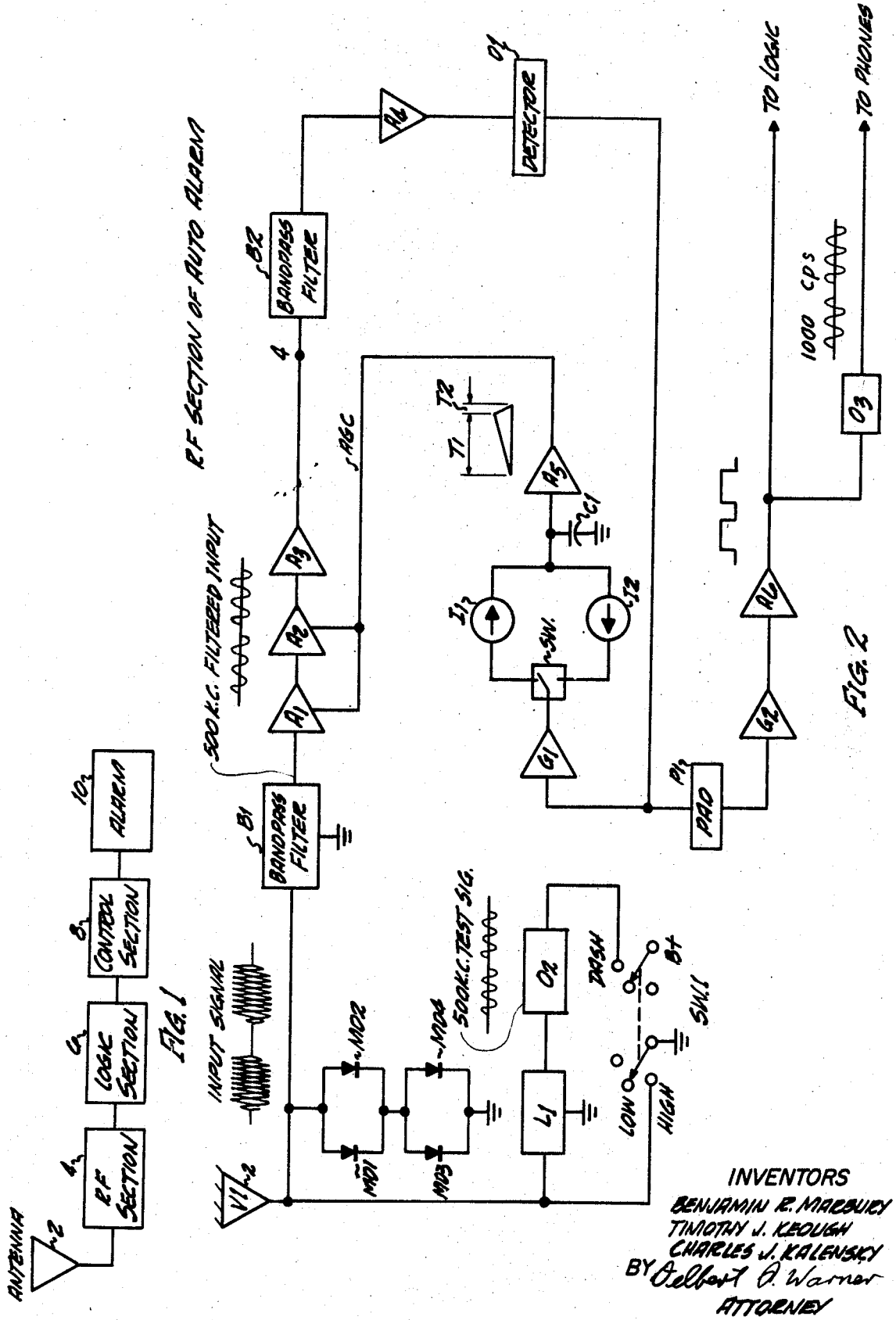

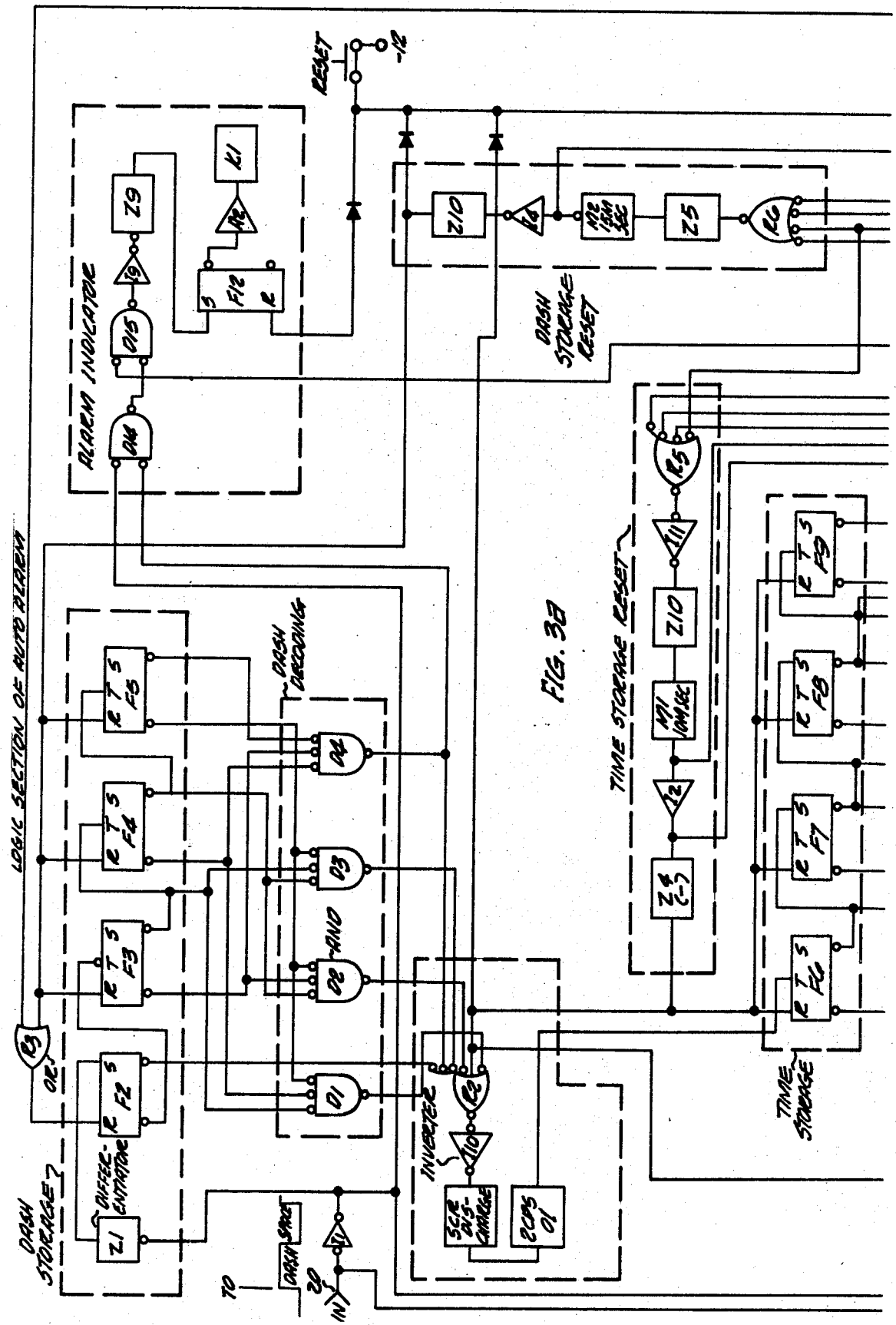

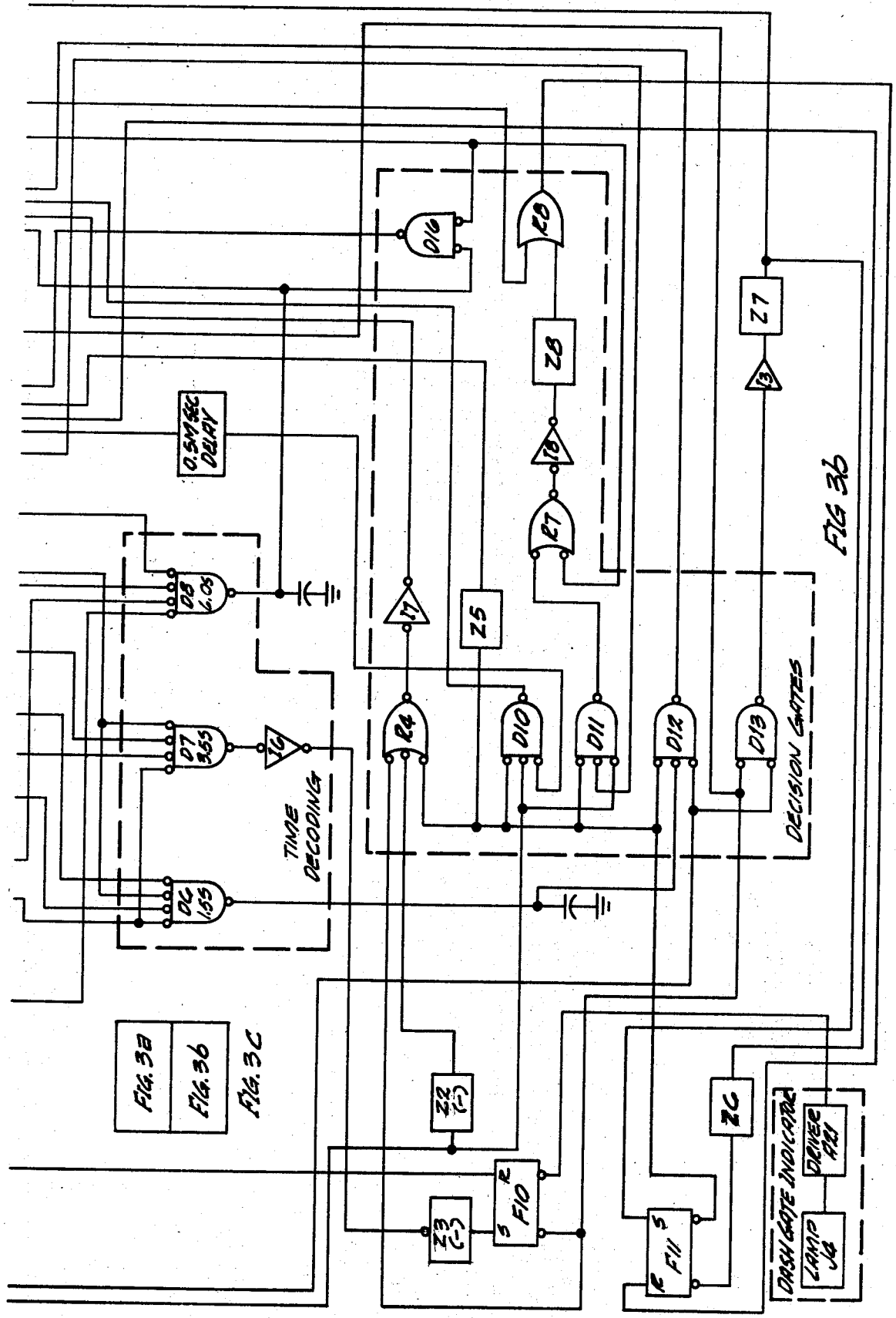

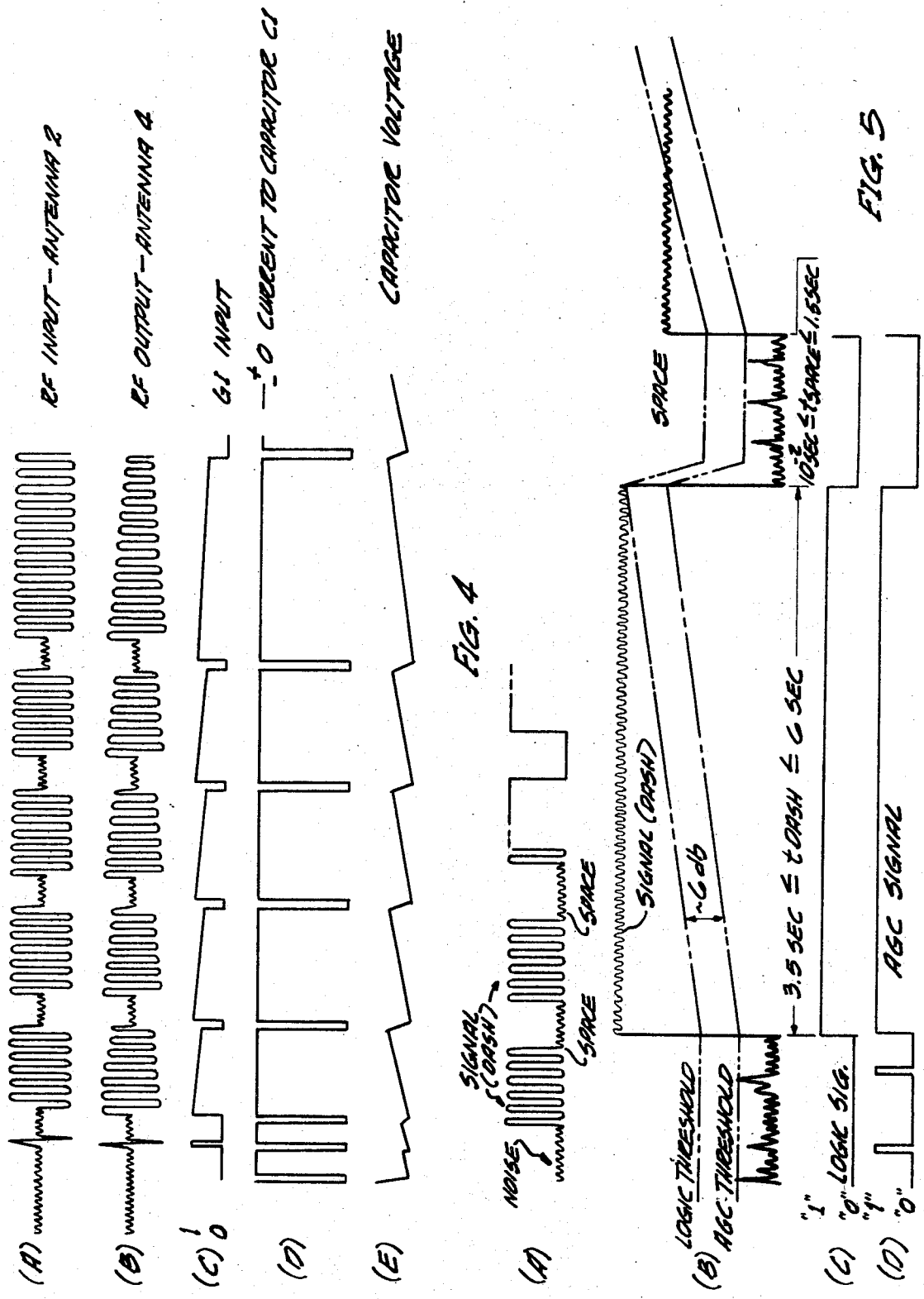

---

3,515,992
AUTOMATIC ALARM DETECTOR
Benjamin Rutledge Marbury, Oak Lawn, Timothy J. Keough, Rolling Meadows, and Charles James Kalensky, Chicago, Ill., assignors to International Telephone and Telegraph Corporation, New York, N.Y., a corporation of Maryland
Filed June 9, 1967, Ser. No. 644,926
Int. Cl. H04b 1/16
U.S. Cl. 325—322                    9 Claims

ABSTRACT OF THE DISCLOSURE

A system is provided for unattended monitoring of international distress signals. The system employs an RF section which responds to all signals in the frequency range of interest. The RF signals are fed to a detector which converts them to DC pulses. The pulses are fed in parallel to two threshold amplifiers. The first of these amplifiers provides an output to an automatic gain control circuit, including a constant signal generator, which adjusts the gain of the RF amplifiers so that they continue to amplify RF pulses of prescribed length, but tend to lose sensitivity to long-term RF carrier signals. The second threshold amplifier has a pad at its input terminal which introduces a 6 db loss and provides a "guard-band" between the ambient noise and the logic threshold to reduce the possibility of triggering due to noise. The second amplifier supplies DC pulses according to the intelligence in the original RF signals. The DC pulses are employed by logic circuits which provide an output signal if (1) at least 4 consecutive pulses are present, (2) the pulses have a duration between 3.5 seconds and 6 seconds, and (3) the pulses are separated by time intervals of between 10 milliseconds and 1.5 seconds duration.

---

This invention is related to that disclosed in a copending United States application entitled "Automatic Alarm Detector," Ser. No. 636,446, filed May 5, 1967 in the name of Ernest C. Karras and assigned to the same assignee as the present invention.

This invention relates to an automatic alarm detector primarily for shipboard installation. It provides means for unattended monitoring of the International Calling and Distress frequency while the ship radio officer is off duty.

To fulfill various regulatory and treaty obligations, ships at sea are required to monitor the International Calling and Distress frequency of 500 kHz. around the clock for the purpose of receiving distress calls. The signals being monitored are type A1 or A2 (unmodulated or modulated CW) with dashes having a duration of at least 3.5 seconds, but not greater than 6 seconds and the spaces appearing between the dashes having a duration of at least 10 milliseconds (.01 second) but not more than 1.5 seconds.

Objects of the present invention include the provision of automatic means for determining whether signals of the prescribed frequency are present, for converting any such signals to digital form and for processing any resulting digital pulses to determine whether a distress signal is, in fact, being received.

In order to attain the foregoing and related objectives, preferred embodiments of this invention have been devised as shown in the circuits illustrated in the attached drawings, in which FIG. 1 is a block diagram of a complete monitoring system, FIG. 2 depicts a preferred RF circuit, FIGS. 3A–C illustrates an exemplary logic system of use in the practice of the invention, FIGS. 4A–E illustrates typical waveforms as they would appear at various stages in the embodiment of FIG. 2 and FIG. 5A–D illustrates various relationships between noise and signal, between logic thresholds and AGC thresholds and also the form of logic and AGC signals.

Turn first to the block diagram of FIG. 1 for an overall view of a detector system in accordance with the invention. A 500 kHz. ±8 kHz. distress signal or other signals and/or noise at levels between 100 microvolts (0.0001 volt RMS) and 1 volt RMS appearing at the antenna 2 will be distinguished from other signals by the RF section 4 where they are filtered, amplified and translated from analog-to-digital form. The resulting digital information is fed into the logic section 6 where it is interrogated to see if it has the proper combination of time durations. After the interrogation, the logic section will either cancel any active storage and reset the system or command the system to accept another burst of signal. If the duration of the first pulse was not less than 3.5 seconds and not more than 6 seconds and the duration between bursts is not less than 10 milliseconds and not more than 1.5 seconds ±10% the second burst of signal will be allowed to advance the storage, otherwise the system will automatically reset to accept a new series of signals. After storing four valid signals at the end of the fourth burst, the logic will command the control section 8 to activate an audible alarm at 10. After activation of the alarm, the system will continue to detect signals, but the internal and external alarms will remain energized until a reset switch associated with the logic section (FIG. 3) is depressed. Power to the system can be derived from a ship's power supply.

The purpose of the RF circuit shown in FIG. 2 is to detect, amplify, control, discriminate and translate a 500 kilo-hertz signal, i.e. a signal at the International Calling and Distress frequency, in the midst of similar transmissions and atmospheric interference.

Upon receiving a signal (100 μv. to 1 v. R.M.S.) 6 db above the existing noise level from the antenna $V_1$ (or antenna 2), the 500 kHz. bandpass filter $B_1$ eliminates all frequencies except those between 492 kHz. and 508 kHz. The remaining signal is then amplified by the gain controlled R.F. amplifiers $A_1$, $A_2$, and $A_3$ to approximately 2 v. R.M.S. The amplified signal together with any accumulated white noise is filtered by the bandpass filter $B_2$ to remove any out-of-band noise introduced by the amplifiers and is further amplified by the predetection amplifier $A_4$. The signal is then converted from analog to digital form by the detector $D_1$ and fed over parallel inputs to two threshold amplifiers ($G_1$ and $G_2$). The first amplifier, $G_1$, is connected to automatic gain control circuitry and the second, $G_2$, is connected through an amplifier $A_6$ to logic circuits and to control the operation of a 1000 Hertz oscillator $O_3$. The oscillator $O_3$ functions as a signal source to indicate a 500 kHz. signal is present.

The PAD ($P_1$) causes the logic threshold amplifier ($G_2$) to be approximately 6 db less sensitive than the AGC threshold amplifier ($G_1$). This provides a "guard-band" between the logic threshold and the AGC threshold, providing a constant margin of 6 db, as shown in FIG. 5B, between the ambient noise and the logic threshold. This reduces false triggering of the logic circuitry by unwanted noise and causes the detector eventually to ignore interference from a constant carrier.

To test the operability of the receiver, the output of a 500 kHz. oscillator is keyed with the required number and duration of dashes by a switch ($SW_1$). The oscillator's output passes through coil $L_1$ which inductively couples the signal into the antenna lead thus simulating the 500 kHz. input. If a noise level is present during the space, using the "High Space" position will ground the antenna circuit to facilitate testing under adverse noise conditions.

Stray lightning radiation (200 v. A.C. and above) and high voltage atmospheric interference 3 v. A.C. to 200 v. A.C. are suppressed to ground by $L_1$ and diodes MD1 through MD4.

When a DC signal is present at the input of the AGC threshold amplifier $G_1$, constant current generator $I_1$, operating through an automatic switch SW, produces a linear increase in voltage with time, on capacitor $C_1$ which thus forms part of an integrating network. Buffer and scaling amplifier $A_5$ isolates the capacitor from the AGC circuit and produces the voltage levels required for proper operation of the AGC circuitry. The charge time $T_1$ of the capacitor $C_1$ is such that it will cause the gain of the system to be reduced by about 10 db in 10 seconds.

Upon removal of the steady DC signal at the input of $G_1$, constant current generator $I_2$, operating through automatic switch SW, reduces the charge on $C_1$ and causes the gain of the system to be increased about 10 db in 10 milliseconds ($T_2$), thus effectively resetting the AGC circuit during a space period. The gain will not be increased to the point where the logic circuit will detect noise because of the previously described guardband.

The output of the automatic gain control isolation amplifier $G_1$ thus can be said to drive two current sources, one to charge the integrating network and cause the incoming signal or noise to be below the threshold of the logic isolation amplifier, and the other to discharge the integrating network, when signal or noise decreases. The output of this network is scaled and applied to the automatic gain control network of the RF circuitry.

The charge and discharge rate of the integrating network are such that during a valid dash period (3.5 to 6 seconds), the gain of the amplifier is not reduced to the point where the detector ceases providing signal data to the logic circuitry, yet during a space period (.01 to 1.5 sec.), the gain is reset to the noise level, so that no accumulated charge remains on the integrating network capacitor, which would decrease the charge rate during the next dash.

As a result of the operation of the constant current generators, and given a reasonable noise level, the automatic gain control circuitry adjusts the gain of the amplifier in the absence of signals, such that the logic portion of the receiver is not required to be continually checking signals which are the result of noise passed along from the detector circuitry. Upon the receipt of a signal of sufficient amplitude to constitute a possible distress signal, the automatic gain control circuit is set to require at least 6 seconds to adjust and, therefore, not to cut-off a valid signal. At the end of an incoming dash the automatic gain control circuit will again increase the gain (i.e., partially reset) to prevent the RF section's sensitivity from being so reduced during a train of valid dashes as to stop detector output. When the gain is increased, it will not be increased so much as to cause the detector to produce a spurious output because of normal noise existing during the space period. In the event that a continuous carrier is present, however, the RF sensitivity will be reduced, enabling the logic to detect a distress signal stronger than the interfering carrier.

The purpose of the digital logic section is to detect 4 correctly timed and correctly spaced DC signals, and following detection, to initiate an audible alarm to indicate a distress signal has been received. The logic circuits incorporated within this equipment are capable only of accepting dashes longer than 3.5 seconds and shorter than 6 seconds where the spaces between dashes are greater than 10 milliseconds and less than 1.5 seconds. If dash and space signals presented to this section have characteristics outside the ranges, they will be rejected as false signals.

The logic section can be divided into ten logic functions. These functions are Dash Storage, Time Storage, Oscillator (timing, gating and synchronization), Time Decoding, Dash Decoding, Time Storage Reset, Dash Storage Reset, Dash Gate Indicator, Alarm Indicator, and Decision Gates.

The Dash Storage function is a storage which remembers how many acceptable dashes have occurred. This function is accomplished in the circuit of FIG. 3 by bistable elements F2, F3, F4, F5 and differentiator Z1.

The Time Storage is a storage which remembers how many half second pulses have occurred from the beginning of either a space or a dash. This storage consists of bistables F6, F7, F8 and F9.

The Oscillator (timing, gating and synchronization) function is performed by "or" gate R2, inverter I10, an SCR discharger, and a two-Hertz oscillator. This function acts as the time reference and is compared to input signals to determine whether proper or improper time duration of incoming signals exists.

Time Decoding is performed by "and" gates D6, D7, D8 and Inverter I6. These gates transform the information stored in the Time Storage section to discrete intervals of time which can be used to establish tolerances of dash and space times.

Dash Decoding is performed by "and" gates D1, D2, D3, and D4. These gates transform the information stored in the dash storage section to a discrete number of dashes. This information is used in enabling the oscillator O1 and in deciding when to trigger the alarm.

Time Storage Reset is accomplished by "or" gate R5, "and" gate D16, inverters I2 and I11, differentiators Z10 and Z4, and a monostable multivibrator M1. This function is performed to clear what had been stored previously in the time storage.

Dash Storage Reset is accomplished by "or" gate R6, differentiators Z5 and Z10, inverter I4, and monostable M2. This function is performed to clear what had been previously recorded in the Dash Storage. This reset occurs every time a false signal is received.

The Dash Gate Indicator includes the "Dash Gate" lamp J4 and driver A21. The lamp lights every time a dash is received for longer than 3.5 seconds.

The Alarm Indicator consists of relays K1, relay driver A2, bistable F12, differentiator Z9, inverter I9 and gates D14 and D15. Upon detection of a properly spaced and correctly timed distress signal, the Alarm Indicator would be triggered, and provide an audible alarm in the form of bells on the bridge and a horn within the Auto Alarm and an audio alarm in the radio operator's quarters.

The Decision Gates each perform a decision necessary in determining whether a signal is valid or invalid. Used in conjunction with these gates are two bistable multivibrators (F10) and (F11) which provide additional information to these Decision Gates. The state of bistable F10 determines whether a possible valid dash has existed longer than 3.5 seconds.

The decisions performed determine if the dashes or the spaces are too short, of proper length, or too long. "Or" gate R4 and inverter I7 provide a signal when a dash is too short. "And" gate D13 provides a signal when a valid dash has been present. "And" gate D16 provides an output when a dash is too long. "And" gate D10 provides a signal when a space has been too short. "And" gate D11 provides an output when a valid space has occurred. "And" gate D12 provides an output when a space is too long.

First, consider the operation of the logic circuit when a *sequence of valid dashes* is received. In the presence of a positive signal at the input 20, invert I1 saturates causing differentiator Z1 to pulse negative and set bistable F2. The transition of bistable F2 causes a count of one to be stored in the Dash Storage. With a count of one in the Dash Storage, "and" gate D1 of the Dash Decoding enables Oscillator O1 via "or" gate R2 and inverter I10.

Oscillator O1 begins timing and every ½ second gates out a negative pulse. These pulses trigger bistables F6, F7, F8 and F9. Upon occurrence of the seventh pulse "and" gate D7 provides a signal via inverter I6 and differentiator Z3 to set bistable F10. The output of F10 lights the "Dash Gate" lamp J4 via driver A21. Bistable F10 also partially enables "and" gate D13 and disables "or" gate R4. Presuming the input signal is valid, the input signal will go negative sometime after the seventh pulse of the oscillator (3.5 seconds) and sometimes before the twelfth (6 seconds). At this time, "and" gate D13 will provide a signal to inverter I3 and differentiator Z7 to reset bistable F2 and F11. Bistable F11 will, in turn, reset the time storage and synchronize the oscillator O1 via Z6 and the Timing Storage Reset. Also bistable F11 partially enables "and" gates D10, D11, and D12 and disables "or" gate R4.

For the first 10 milliseconds of the ground or space signal at inverter I1 input, "and" gate D10 is partially enabled by monostable M1 via 0.5 ms. delay, while "and" gate D11 is disabled by monostable M1 via inverter I2. After the first 10 milliseconds, monostable M1 times out, enabling "and" gate D11 and disabling "and" gate D10. Again assuming a valid signal, the input signal should go positive before the third pulse of oscillator O1. This positive signal would store a count of two into the Dash Storage. "And" gate D11 would provide a reset to bistable F11. Bistable F11 would again cause synchronization of oscillator O1 and reset the Time Storage. This process would continue until a count of four was stored in the Dash Storage. "And" gate D4 decodes the count of four and partially enables "and" gate D14. Upon the end of the fourth dash, the output of inverter I1 goes positive enabling "and" gate D14 which, in turn, enables "and" gate D15. The output of D15 then sets bistable F12 via inverter I9 and differentiator Z9 which cause the audible alarm to be activated.

Invalid signals from the RF system may give rise to diverse operations in the logic system. But each such invalid signal must cause the logic system to be reset to its initial condition. The ways in which errors are detected and the manner in which they are used in resetting the system is set out in the following paragraphs.

In the event a *dash is too short*, the gate R4 will operate. R4, although labeled as an "or" gate, will function as an "and" gate for zeros. Bistable F10 provides a ground signal until it is set by the 3.5 seconds pulse output of "and" gate D7. Since this pulse only occurs when a dash is long enough, the signal from F10 partially enables R4. Bistable F11 partially enables R4. When the input signal goes negative, differentiator Z2 provides a signal to R4 causing inverter I7 to reset the total system back to $T_0$ and zero cycle count.

In case of *too long a dash* a positive signal remains at the input longer than 6 seconds, "and" gate D8, partially enables "and" gate D16 and triggers monostable M2 via R6 and Z5. The monostable then enables "and" gate D16. This process is used to avoid logic race conditions that might otherwise exist. Gate D16 causes a total system reset and zero cycle count.

Immediately after the input signal goes negative, D10 is partially enabled by M1 and F11 for 10 milliseconds. If during this period the input were to go positive for any reason (indicating *too short a space*) D10's inputs would be fully satisfied, and it would gate out a positive to R6 thus resetting the total system back to $T_0$ and zero cycle count.

If the duration of a *space is too long*, allowing the timer to advance to a count of 1.5 seconds, D6 will pulse D12 with a positive. Since D12 is already partially enabled by positives from F11 and I1, it is fully satisfied, thus it pulses out a positive pulse to R6 and resets the total system back to $T_0$ and zero cycle count.

While the principles of the invention have been described above in connection with specific apparatus and applications, it is to be understood that this description is made only by way of example, and not as a limitation on the scope of the invention.

What is claimed is:

1. An automatic system for unattended monitoring of RF signals received through an antenna system and through a bandpass filter, wherein the improvement comprises:
    RF amplifiers for receiving and amplifying RF signals, detector means for converting said RF signals to digital pulses,
    a threshold amplifier for receiving said digital pulses,
    a constant current generator coupled to the output of said threshold amplifier,
    a capacitor coupled to the output of said constant current generator,
    said constant current generator responding to output signals from the threshold amplifier indicating the presence of a digital pulse on the input of said amplifier to apply current to said capacitor,
    said constant current generator responding to signals indicating the absence of a pulse from the input of said amplifier by removing current from said capacitor,
    an isolating amplifier coupling the potential of said capacitor to said RF amplifiers to adjust the gain of said RF amplifiers, whereby the gain of said RF amplifiers decreases as the charge on the capacitor increases and the gain increases as the charge on the capacitor decreases,
    a pad for receiving said digital pulses, and
    another threshold amplifier connected to receive said digital pulses through said pad and to provide logic signals,
    said pad introducing a threshold difference between signals from the threshold amplifier and signals from another threshold amplifier to provide a difference in amplitude between automatic gain control signals and logic signals whereby a constant margin between the ambient noise threshold and the logic threshold reduces the chance of false triggering through noise.
2. An automatic system as claimed in claim 1, in which the logic signals are received by and processed by logic circuits which eliminate pulses that are too long, too short, too widely spaced or too closely spaced, and
    said logic circuits connect to an alarm indicator for providing a warning signal if four consecutive pulses of prescribed length and spacing occur.
3. An automatic system as claimed in claim 2, in which
    means are provided which invert and differentiate the logic signals,
    the logic circuits include dash storage elements for directly receiving said differentiated logic signals,
    said dash storage elements include a plurality of bistable elements responsive to the differentiated logic signals to be set in accordance with the number of said logic signals, and
    the logic circuits include dash decoding elements responsive to said dash storage elements to provide an output signal when four pulses are recorded.
4. An automatic system as claimed in claim 3, in which time storage elements are provided for use in determining the lengths of spaces and pulses in terms of time,
    an oscillator is connected for supplying timing pulses,
    said time storage elements are connected to count the pulses from the oscillator, and
    said oscillator is restarted in response to a start signal from said dash storage.
5. An automatic system as claimed in claim 4, in which time decoding elements are supplied with signals from the time storage elements, and
    decision gates are supplied with signals from the time decoding elements and signals from other logic elements to provide output signals.
6. An automatic system as claimed in claim 5, in which time storage reset elements are provided responsive to pulses from the decision gates indicating that pulses or spaces are of improper duration, said time storage reset elements further providing a reset signal to reset said time storage to zero and to inhibit the operation of said oscillator.

7. An automatic system as claimed in claim 5, in which dash storage reset elements are provided responsive to pulses from the decision gates indicating that false signals have been received, said dash storage reset elements further providing a reset signal to reset said dash storage elements and clear the dash storage of previously recorded information.

8. An automatic system as claimed in claim 5, in which an alarm indicator is provided, said alarm indicator providing a positive indication in response to receipt of (1) signals from said decision gates indicating the pulses are of proper length, (2) signals from said dash storage elements indicating that four pulses have been received, and (3) signals from the inverter means indicating that a space is presently being received.

9. An automatic system as claimed in claim 5, in which a dash indicator is provided responsive to a signal from said time decoder element whenever the time decoder element indicates a dash has been received for longer than the minimum required time period.

References Cited

UNITED STATES PATENTS

| | | | |
|---|---|---|---|
| 2,116,990 | 5/1938 | Watanabe | 340—164 |
| 2,235,804 | 3/1941 | Macalpine | 340—164 |
| 2,533,765 | 12/1950 | Chauveau | 340—164 |
| 2,552,174 | 5/1951 | Holloway | 340—164 |
| 2,564,692 | 8/1951 | Hoeppner | 340—164 |
| 2,655,596 | 10/1953 | Heeren | 325—326 |
| 2,761,060 | 8/1956 | Bradley et al. | 340—164 X |
| 2,834,003 | 5/1958 | Abelew | 340—164 |
| 3,000,002 | 9/1961 | Rehahn | 340—164 |
| 3,293,606 | 12/1966 | Ackerman et al. | 340—167 |

ROBERT L. GRIFFIN, Primary Examiner

J. A. ORSINO, JR., Assistant Examiner

U.S. Cl. X.R.

325—364, 326; 340—164, 167